United States Patent
Portnoy et al.

(10) Patent No.: US 11,543,766 B2
(45) Date of Patent: Jan. 3, 2023

(54) RESTRICTING REPLACEMENT OF COMPONENTS

(71) Applicant: Hewlett-Packard Development Company, L.P., Spring, TX (US)

(72) Inventors: Vitaly Portnoy, Ness Ziona (IL); Michel Assenheimer, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/417,172

(22) PCT Filed: Sep. 5, 2019

(86) PCT No.: PCT/US2019/049657
§ 371 (c)(1),
(2) Date: Jun. 22, 2021

(87) PCT Pub. No.: WO2021/045757
PCT Pub. Date: Mar. 11, 2021

(65) Prior Publication Data
US 2022/0187752 A1  Jun. 16, 2022

(51) Int. Cl.
*G03G 15/00* (2006.01)

(52) U.S. Cl.
CPC .................. *G03G 15/55* (2013.01)

(58) Field of Classification Search
CPC .... G03G 15/55; G03G 15/553; G03G 15/556; G03G 2221/1663; G03G 2221/1666; G06F 3/121; G06F 3/1204
See application file for complete search history.

(56) References Cited

U.S. PATENT DOCUMENTS

| | | | |
|---|---|---|---|
| 6,295,423 B1 | 9/2001 | Haines et al. | |
| 6,697,586 B2 | 2/2004 | Yamamoto et al. | |
| 7,444,088 B2 | 10/2008 | Radulski et al. | |
| 8,660,442 B2 | 2/2014 | Spink et al. | |
| 9,400,468 B2 | 7/2016 | Wood | |
| 2004/0099733 A1* | 5/2004 | Brookner | G07C 9/00309 235/382 |
| 2004/0101321 A1* | 5/2004 | Alegria | G03G 15/5016 399/80 |
| 2005/0283666 A1 | 12/2005 | Marshall et al. | |
| 2006/0045546 A1 | 3/2006 | Okochi | |
| 2008/0310864 A1* | 12/2008 | Katoh | G03G 15/5079 399/26 |
| 2009/0119066 A1 | 5/2009 | Strong et al. | |

(Continued)

*Primary Examiner* — Carla J Therrien (57) ABSTRACT

A computer-implemented method is disclosed. The method includes receiving a first indication that a first replaceable component of a print apparatus has been replaced; receiving, prior to any print impressions being made using the print apparatus since receiving the first indication, a second indication of an intention to replace a second replaceable component of the print apparatus; retrieving data regarding previous replacements of replaceable components of the print apparatus; determining, based on the retrieved data, whether or not replacement of the second replaceable component is to be restricted; and responsive to determining that replacement of the second replaceable component is to be restricted, restricting replacement of the second replaceable component. An apparatus and a machine-readable medium are also disclosed.

13 Claims, 4 Drawing Sheets

(56) References Cited

U.S. PATENT DOCUMENTS

| | | |
|---|---|---|
| 2012/0099877 A1 | 4/2012 | Funatsu |
| 2012/0250064 A1* | 10/2012 | Wood .................... G03G 15/55 |
| | | 358/1.14 |
| 2013/0136459 A1 | 5/2013 | Hirama |
| 2014/0023382 A1* | 1/2014 | Kawana ................ G03G 15/55 |
| | | 399/8 |
| 2018/0267428 A1 | 9/2018 | Kawajiri |
| 2018/0299815 A1 | 10/2018 | Sakaguchi et al. |
| 2020/0356325 A1* | 11/2020 | Smith ................... G06F 3/1219 |

* cited by examiner

RESTRICTING REPLACEMENT OF COMPONENTS

BACKGROUND

Some print apparatuses have components that are considered to be replaceable. Such components may be replaced (e.g. by an operator) when they become worn or damaged or when they reach or are near to an end of their useful life.

BRIEF DESCRIPTION OF DRAWINGS

Examples will now be described, by way of non-limiting example, with reference to the accompanying drawings, in which.

DETAILED DESCRIPTION

In a print apparatus that has replaceable components, an end user or operator may replace the component when the component is due to be replaced, for example when it reaches the end of its useful life, or when it is determined that the component is damaged, worn, or has suffered a failure. As used herein, the term "replaceable component" is intended to describe a component which is intended to be replaced at the end of its life, once it is worn or deteriorated, or in the event that it is responsible for, or contributes to, a print quality defect during a printing operation. Such a component may sometimes be referred to as a consumable component. Different types of print apparatuses may have different components that are replaceable. For example, a liquid electrophotography (LEP) print apparatus may have various replaceable components. In an LEP print apparatus, print agent, such as print fluid, may pass through a print agent application assembly, such as a binary ink developer (BID). Print agent from a BID is to be selectively transferred from a print agent transfer roller—also referred to as a developer roller—of the BID to a photoconductive surface, such as a photo imaging plate (PIP). The entire PIP of the print apparatus is charged, then areas representing an image to be printed are discharged. Print agent that includes chargeable particles (e.g. LEP print fluid or ink) is transferred to those portions of the PIP that have been discharged. The PIP transfers the print agent to a printing blanket, which subsequently transfers the print agent onto a printable substrate, such as paper. Within an LEP print apparatus, the PIP and the printing blanket may be replaceable. Similarly, the developer roller of the BID and a base part of the BID may also be replaceable.

The present disclosure may also be applicable to other types of print apparatuses, such as inkjet print apparatuses, in which other components may be replaceable. The disclosure may also be applicable to an additive manufacturing apparatus (sometimes referred to as a 3D print apparatus).

In the event that a replaceable component of a print apparatus is to be replaced, then print operations performed using the print apparatus may be stopped temporarily while the component is replaced. In some scenarios, a user or operator of the print apparatus may be inclined to replace multiple components of the print apparatus while the print operations are paused, for example to avoid pausing print operations again at a later time, when other components are to be replaced. For example, if a photo imaging plate (PIP) of an LEP print apparatus is to be replaced by an operator (e.g. because he has determined that a print quality defect is associated with the PIP), the operator may temporarily stop the print apparatus from performing its print operation, while the print apparatus is in the "maintenance mode". While the print operation is paused, the operator may choose to also replace a printing blanket of the print apparatus. However, the printing blanket may not be responsible for or associated with any print quality defects and, therefore, it may not be appropriate to replace the printing blanket at the same time as the PIP. Untimely replacement of components within a print apparatus may incur additional costs and may lead to wastage of materials. Furthermore, excessive component replacement may lead to a loss of productivity. Thus, examples disclosed herein provide a mechanism by which the replacement of a component may, in some scenarios, be restricted.

The act of replacing multiple (i.e. two or more) components of a print apparatus during the same pause in printing operations may be referred to as a parallel replacement. More specifically, a parallel replacement may be considered to be a replacement of two or more components of a print apparatus at the same print impression count of the print apparatus. A print impression count is a measure of the number of impressions made by the print apparatus (e.g. a number of images formed on a component—such as a photo imaging plate—of the print apparatus). In some examples, each time an image is formed on the component, the print impression count increases by 1. In some examples, print impressions may be measured in terms of revolution cycles (or fractions thereof) of a surface, belt, drum or roller. Thus, in an example in which a component such as a drum is capable of transferring two images via its surface (e.g. around its circumference), a single revolution of the drum would result in two print impressions being made. For example, if a print impression count is at x, then a parallel replacement is considered to have taken place if multiple print components of the print apparatus are replaced before the print impression count advances to x+1. In some examples, components replaced as part of a parallel replacement may be considered to be replaced at the same time, for example simultaneously. However, it will be understood that components are often replaced one at a time. A print impression count may be made in respect of each replaceable component of the print apparatus, and this may be referred to as a component impression count. Thus, the print impressions made using the first replaceable component may be recorded in addition to (and independently of) the print impressions made using the second replaceable component. The number of parallel replacements (or the parallel replacement rates) may be monitored and recorded in respect of individual components of the print apparatus. Put another way, a print impressions counter or a print apparatus may, in one example, count a number of drum or roller revolutions from the first use of the print apparatus. A component impression counter may be considered a relative counter, starting when a component is installed. Each component impression counter may use the print apparatus impression counter as a reference, counting component impressions and apparatus impressions at the same pace. However, the component impression count is determined by the current apparatus impression count minus the apparatus impression count at the time of installation of the component.

Examples disclosed herein provide methods, apparatuses and machine-readable mediums which enable monitoring of the frequency that parallel replacements are performed for a particular print apparatus, and which make use of the parallel replacement rates to determine whether or not replacement of a particular component is to be restricted. In a general sense, if it is apparent that parallel replacement rates for a particular print apparatus have historically been particularly high, then it may be appropriate to prevent or restrict further parallel replacements from being made. In some examples, as will become clear from the following discussion, a parallel replacement may not be restricted, even if previous parallel placement rates are high. For example, if it is determined that a parallel replacement is to be made because a component has failed or has led to an occurrence of a print quality defect, then a parallel placement may be enabled despite high parallel replacement rates in the past.

When an operator of a print apparatus intends to replace a first component of the print apparatus, the operator may initiate a program or application which is executable using a processor of the print apparatus. Such a program or application may be referred to as a component replacement program or application and, in some examples, may be referred to as the replacement "wizard". A replacement wizard is an application that may cause a set of instructions to be displayed, for example on the user interface of the print apparatus, which provide an action-by-action guide to guide the operator through the component replacement procedure. Once replacement of the first component has been completed, and all the processes of the replacement wizard have been performed, the wizard may end and the component replacement procedure may be considered complete. If, before the print apparatus is used to perform any further print jobs (i.e. before any more print impressions are made using the print apparatus), the operator were then to initiate a replacement wizard in respect of a second component of the print apparatus then, according to examples of the present disclosure, it may be determined that the operator is attempting to perform a parallel replacement (i.e. replacement of both the first and second components without increasing the number of print impressions made by the print apparatus). If the second component is replaced before any further print impressions are made using the print apparatus (i.e. if a parallel replacement is performed) then the parallel replacement counters in respect of components of the print apparatus may each be increased by one. The number of parallel placements made in respect of a particular component may be monitored and recorded, for example in a database stored in a storage medium. Thus, the number of parallel replacements may be monitored and recorded for each component. Different pairs of components may be replaced as part of a parallel replacement, and different components may be replaced separately, for example not as part of a parallel replacement, resulting in the parallel replacement count for various components being different. For example, consider a pair of components in a print apparatus: the PIP and the print blanket. The print blanket may have been replaced 12 times on its own (i.e. not as part of a parallel replacement) and 10 times as part of a parallel replacements, meaning that it has a 10/22 parallel replacement ratio. The PIP may also have been replaced 10 times as part of a parallel replacement, and just 3 times on its own (i.e. not as part of a parallel replacement), meaning that it has a 10/13 parallel replacement ratio.

Figure 1:
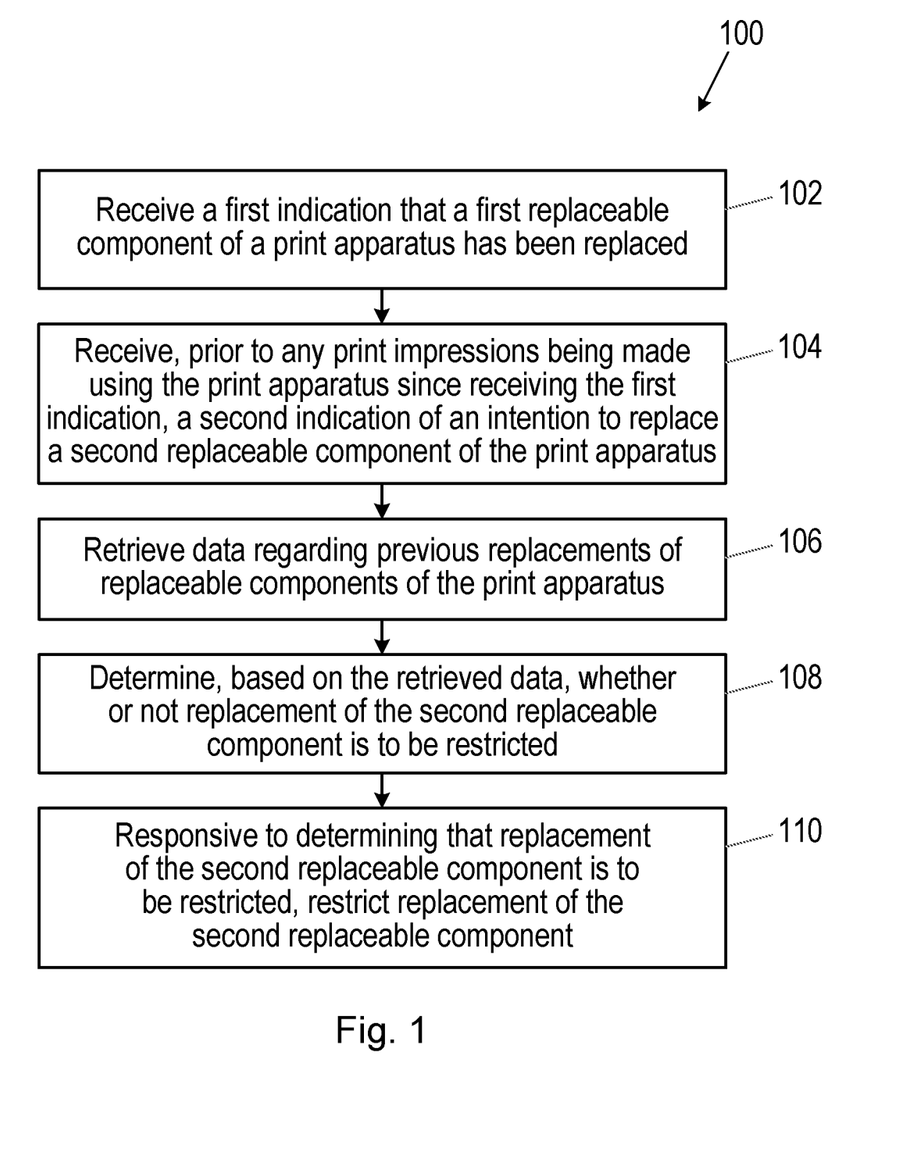
FIG. 1 is a flowchart of an example of a method of restricting the replacement of a replaceable component.

Examples of the present disclosure will now be described with reference to the Figures. FIG. 1 is a flowchart of an example of a method 100 which may, in some examples, be considered to be a component replacement restriction method. The method 100 may be a computer-implemented method; thus, the method 100 may be performed using a processing apparatus (e.g. a processor) of a computing device. In some examples, the method may be performed using a processor of the print apparatus whose component has been, or is to be, replaced. In other examples, the method may be performed using a processor of a separate (e.g. remote) computing device, such as a desktop computer, a laptop computer, a tablet computer, a smart phone or the like. The method 100 comprises, at block 102, receiving a first indication that a first replaceable component of a print apparatus has been replaced. The first indication may, for example, comprise an indication that all of the actions of a replacement wizard have been performed in respect of the first replaceable component, such that the replacement of the first replaceable component has been completed.

In some examples, once a component of a print apparatus has been replaced, a processor of the print apparatus may generate and/or transmit a signal indicating that the component has been replaced. The transmitted signal may be received by the processor or computing device performing the method 100.

At block 104, the method 100 comprises receiving, prior to any print impressions being made using the print apparatus since receiving the first indication, a second indication of an intention to replace a second replaceable component of the print apparatus. Thus, the second indication received at block 104 is received after receipt of the first indication, and before the print apparatus is used to perform any further print operations. In other words, between receipt of the first indication and the second indication, a print impression counter of the print apparatus has not advanced or increased. Receiving the second indication before the print apparatus is used for further printing may be considered indicative of an attempt to perform a parallel replacement.

The indication of an intention to replace a second replaceable component of the print application (i.e. the second indication of block 104) may, for example, comprise an indication that an operator has initiated a replacement wizard in respect of the second replaceable component. In other examples, the second indication may comprise an indication that the operator has commenced a component replacement procedure. For example, an intention to replace the second replaceable component may be considered to be received when activation of the first action in a sequence of actions is detected. The sequence of actions may represent the replacement wizard. While, in some examples, an intention to replace the second replaceable component may be detected by a computing device or processor performing the method 100, in other examples, the print apparatus (or a processor thereof) may generate and/or transmit a signal indicating the intention to replace the second replaceable component, which may be received by the processor or computing device performing the method 100.

The method 100 comprises, at block 106, retrieving data regarding previous replacements of replaceable components of the print apparatus. Such data may, for example, be stored within a database or some other data structure, in a storage medium (e.g. a memory) within or associated with the print apparatus. For example, each time a replaceable component of the print apparatus is replaced, information regarding the replacement (e.g. information identifying the replaced component, information indicating a print impression count of the print apparatus at the time of the replacement, information indicating a number of print impressions performed using the replaced component at the time of the replacement, and/or information indicating whether or not the replacement was part of a parallel replacement) may be stored in the storage medium. In some examples, the data may include an indication of a number of parallel replacements made previously in respect of a component or of multiple components of the print apparatus.

At block 108, the method 100 comprises determining, based on the retrieved data, whether or not replacement of the second replaceable component is to be restricted. In a general sense, the determination of block 108 may be made based on the number of parallel replacements made previously in respect of components of the print apparatus. In some examples, the determination of block 108 may be made based on the number of parallel placements made in respect of components of the print apparatus over a defined period of time (e.g. during the past day or the past year, or since the print apparatus has been operated by the current operator). In some examples, the parallel replacement count may be measured as a parallel replacement "rate". A parallel replacement rate may comprise a ratio of parallel replacements relative to the last N component replacements. A value of N may be 10, 20, 30, or the like, for example. In some examples, N may be considered a rolling buffer, such that, each time a component is replaced, the replacement is noted and an indication of the replacement is stored as an entry in the N entries; the oldest entry in the N entries is discarded. In this way, older parallel replacement events may not be taken into account.

In some examples, replacement of the second replaceable component may be restricted if the retrieved data indicates that a number of occurrences of multiple replaceable components being replaced at the same print impression count of the print apparatus exceeds a defined threshold. In other words, replacement of the second replaceable component may be restricted if the retrieved data indicates that the number of parallel replacements made in respect of a component or components of the print apparatus exceeds a defined threshold. Here, multiple replaceable components is intended to cover two or more components that can be, or are intended to be, replaced. As noted above, the print impression count of the print apparatus may be monitored and/or recorded each time a replaceable component of the print apparatus is replaced. Thus, if multiple components are replaced at the same print impression count of the print apparatus (i.e. without the print impression count advancing between the first indication and the second indication being received), then the multiple replacements may be recorded as parallel replacement events. In some examples, the defined threshold may comprise a threshold defining a proportion of component replacement events that are performed as part of a parallel replacement. For example, replacement of the second replaceable component may be restricted if the retrieved data indicates that more than 50% of the previous replacements of replaceable components on the print apparatus have been performed as part of parallel replacements. In other examples, the defined threshold may be higher or lower proportion of parallel placements; for example, the defined threshold may comprise 40%, 50%, 60%, 70% or 80%. In some examples, the defined threshold may comprise an absolute number, such as five or ten parallel replacements, or a number of parallel replacements performed during a particular period of time.

In another example, the same component (e.g. the first component) may be replaced during at the same print impression count of the print apparatus. Such a replacement may be made, for example, if the new component (i.e. the component that replaced the original component) were to fail immediately. An example of this scenario might be if the first component comprises the PIP and the second component also comprises the PIP. Such a parallel replacement may be allowed/enabled, and may not be counted as a parallel replacement in the parallel replacement count in respect of that component.

If, at block 108, it is determined that replacement of the second replaceable component is to be restricted, then the method 100 comprises restricting replacement of the second replaceable component. Thus, at block 110, the method comprises, responsive to determining that replacement of the second replaceable component is to be restricted, restricting replacement of the second replaceable component. Various actions may be taken in order to restrict replacement of the second replaceable component. Multiple actions (e.g. more than one of the actions discussed below) may be taken to restrict replacement. In some examples, the action that is taken to restrict the replacement may be based on the data retrieved at block 106. For example, as will be apparent from the discussion below, different restrictive actions may be taken at block 110 depending on the number of parallel replacements performed previously in respect of a component or components of the print apparatus, depending on the parallel replacement rate or rates of the components.

The restrictive action to be taken at block 110 may involve the computer or processor performing the method 100 engaging or interacting with the print apparatus. In one example, the restrictive action may involve initiating and interaction with an operator of the print apparatus, for example to inform the operator that a parallel replacement may not be appropriate and/or to inform the operator that the second replaceable component can function adequately for more print impressions. The interaction with the operator may involve informing the operator that it may be inappropriate to replace the second replaceable component at that time. In some examples, restricting replacement of the second replaceable component may comprise causing the print apparatus to display a message on a user interface of the print apparatus. For example, a message may be displayed requesting an operator to confirm that they definitely intend to replace the second replaceable component and/or a message requesting the operator to provide a reason for their intention to replace the second replaceable component. Restricting the replacement of the second replaceable component may further comprise causing the print apparatus to receive a user input before enabling the replacement of the second replaceable component. For example, the replacement of the second replaceable component may be enabled responsive to determining that a user input has been made. In one example, the user input may comprise a defined user input. For example, the replacement of the second replaceable component may be restricted until the operator has provided the defined user input. In one example, the defined user input may comprise a selection (e.g. from a list) of a permitted or allowed reasons for performing a parallel replacement. For example, an indication by the operator that the second replaceable component has failed in some way may be sufficient for the replacement of the second replaceable component to be enabled. The replacement may be enabled by allowing the operator to continue with the replacement, for example, using the replacement wizard.

The method 100 may be applicable in respect of any replaceable components of a print apparatus. Some replaceable components of a print apparatus may be replaced more regularly as part of a parallel replacement than others. For example, in an LEP print apparatus, a photoconductive surface (e.g. the PIP) may be replaced as part of a parallel replacement with a transfer medium (e.g. the printing blanket); similarly, a base of a print agent application assembly (e.g. the BID) may be replaced as part of a parallel replacement with a developer roller of the BID. Thus, in some examples, the first replaceable component or the second replaceable component may comprise a component selected from a group comprising: a photoconductive surface; a transfer medium to receive print agent from the photoconductive surface; a print agent application assembly base; and a developer roller of a print agent application assembly.

As noted previously, each replaceable component of a print apparatus may have a respective estimated life span, after which it may be accepted, or even expected, that the component may be replaced. The estimated life span a component may be measured in terms of the number of print impressions made by a print apparatus using the component. In some examples, an estimated life span of a component may be based on an average life span of a number of similar components, for example in a number of different print apparatuses. The estimated life span of a component may be dynamic, meaning that the estimated life span may increase later in the component's life. Thus, while an average estimated life span for a printing blanket may be a particular number of print impressions, once a printing blanket has been used for a large number of print impressions, it may be expected that the printing blanket will be suitable for an additional number of print impressions, meaning that the estimated remaining life span for the printing blanket changes. For example, as the print impression counter of the component increases, the number of impressions printed by the component and estimated number of impressions that can still be made, will also increase monotonically.

In some examples, an estimated remaining life span of a replaceable component may be indicated to an operator (e.g. via a user interface of the print apparatus), so that the operator is able to understand how many more print impressions might be achievable using the print component before it is due or expected to be replaced. Thus, in some examples, restricting the replacement of the second replaceable component may comprise causing the print apparatus to display the estimated remaining life of the second replaceable component. Thus, in some examples, the message to be displayed on the user interface of the print apparatus may comprise an indication of the estimated remaining life of the second replaceable component. For example, once it is determined that the operator intends to replace the second replaceable component, the operator may be informed that the second replaceable component is still expected to be usable for a particular number of print impressions. Such a message may serve as a reminder to the operator that it is not appropriate to replace the second replaceable component at that time, but it may be more appropriate to replace the second replaceable component at a later time, nearer to the estimated end of its life.

The restrictive action taken (at block 110), including the nature of any message displayed on the print apparatus, may depend on the frequency at which previous component replacements in the print apparatus have been part of parallel replacements. If the retrieved data regarding previous replacements indicates that performing parallel replacements is a rare occurrence in respect of a component or components of that print apparatus, then the replacement of the second replaceable component may be enabled; that is to say no restrictive action may be taken, or any restrictive action taken or started at block 110 is cancelled or removed. If the retrieved data indicates that performing parallel replacements occurs somewhat frequently (e.g. if between 50% to 70% of replacements are performed as part of parallel replacements), then "gentle" restrictive action may be performed, such as displaying a persuasive or encouraging message aimed at probing whether or not it is really appropriate to perform a parallel replacement. However, if the retrieved data indicates that performing parallel replacements occurs very frequently (e.g. if more than 70% of replacements are performed as part of parallel replacements), then more persuasive or "aggressive" restrictive action may be performed, such as displaying a more persuasive message aimed at discouraging the operator from performing parallel replacements, or even requesting the user to perform a particular action, such as providing a reason for performing the parallel replacement, as discussed above. In extreme cases, the retrieved data may indicate that parallel replacements are performed in a large number of cases (e.g. more than 80% of replacements are performed as part of parallel replacements). In such cases, extreme restrictive action may be performed, such as temporarily preventing further printing using the print apparatus altogether. Thus, in some examples, restricting replacement of the second replaceable component may comprise restricting further printing operations using the print apparatus, until it is determined that a defined criterion has been met. Similarly, in some examples, restricting replacement of the second replaceable component may comprise causing the print apparatus to display a message on a user interface of the print apparatus. The method may comprise restricting further printing operations using the print apparatus until is it determined that a defined user input has been received via the print apparatus. For example, while the replacement of the second replaceable component may be enabled, further printing using the print apparatus may be prevented or limited unless the print apparatus receives a particular user input, such as an agreement to contact the print apparatus supplier. The input may be provided using the user interface of the print apparatus.

In some examples, further printing operations using the print apparatus may be restricted in addition to performing other restrictive actions regarding the replacement of the second replaceable component. For example, a message may be displayed to an operator of the print apparatus and printing operations may be suspended. In this example, the defined criterion that is to be met may comprise initiating an interaction or engagement with the operator or a representative of the operator. For example, in extreme cases, where a large number of parallel replacements are performed in respect of components of a print apparatus, it may be appropriate to engage with the owner or leaser of the print apparatus in order to explain that parallel replacements are not always appropriate and, therefore, discourage the performance of future replacements. In one example, a customer service call may be initiated between the supplier of the print apparatus or components and the operator or a representative for the operator.

In some situations, even though the data retrieved at block 106 may indicate that a large proportion of component replacements are performed as part of parallel replacements, it may be appropriate to enable the second replaceable component to be replaced (and therefore enable a parallel replacement to be performed). Similarly, in some examples, the occurrence of a parallel replacement may not be recorded as such in a record (e.g. a database) of data regarding previous replacements. Examples of scenarios in which a parallel replacement may be enabled and/or in which a parallel replacement may not be recorded as such include replacements performed due to a print quality defect and/or a failure relating to or associated with a print component. Such examples are discussed in greater detail below, with reference to FIG. 2.

Figure 2:
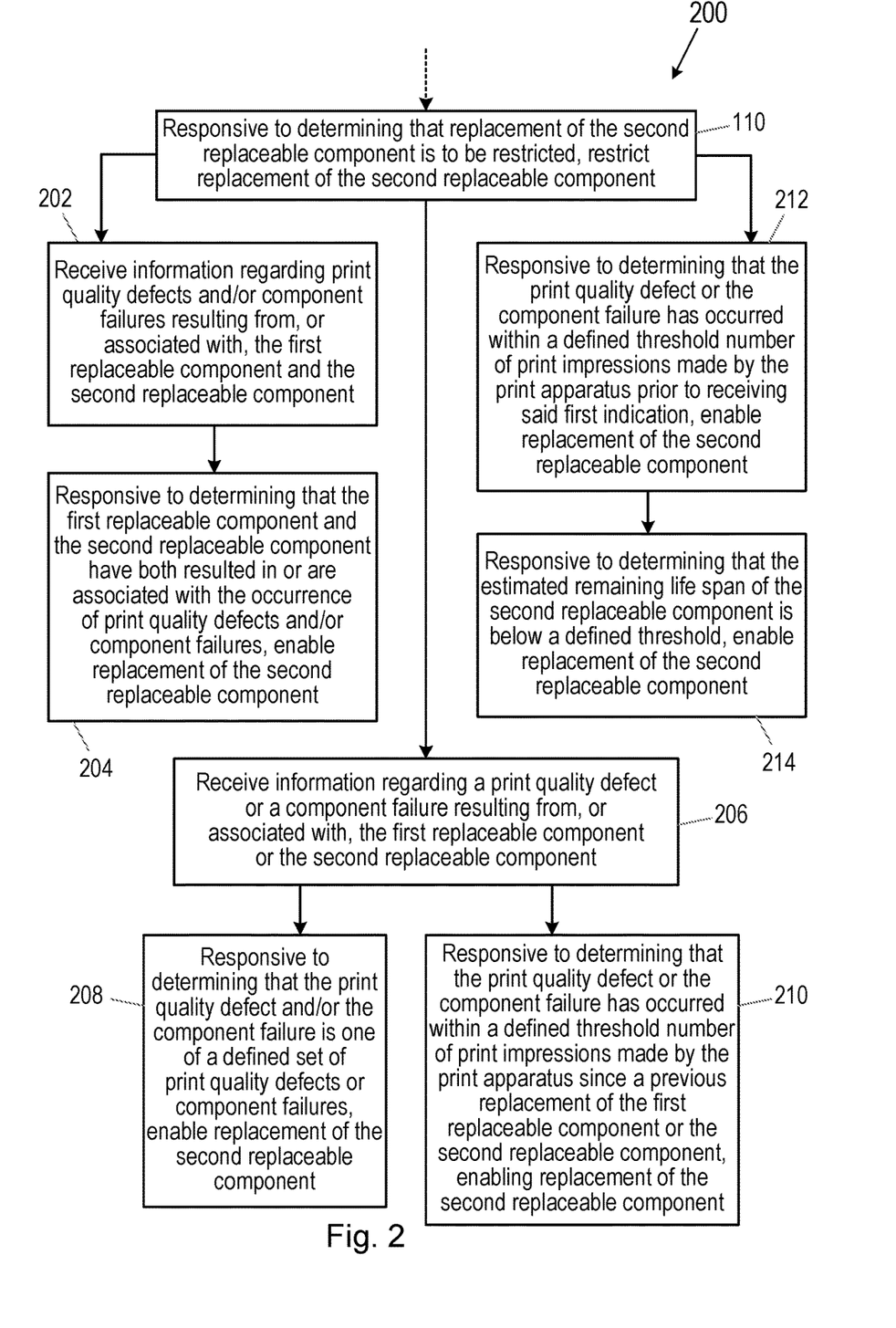
FIG. 2 is a flowchart of a further example of a method of restricting the replacement of a replaceable component.

FIG. 2 is a flowchart of a further example of a method 200. The method 200 may comprise a method for restricting the replacement of components, and may comprise a computer implemented method. The method 200 may include blocks of the method 100 discussed above. For clarity, just block 110 of the method 100 is shown in FIG. 2, but it will be understood that FIG. 2 may also include other blocks of the method 100. In some examples, the method 200 may comprise, at block 202, receiving information regarding print quality defects and/or component failures resulting from, or associated with, the first replaceable component and the second replaceable component the information may, in some examples, comprise information stored in a database or in some other data structure in a storage medium, describing print quality defects and/or component failures in relation to the first or second replaceable components. The information may have been entered by an operator recording the occurrence of such defects or failures, or the information may be obtained from an event log which stores records of such events. In some examples, the component failure may not comprise a failure of the first or second replaceable components themselves, but may comprise the failure of some other component of the print apparatus which is associated with the first replaceable component or the second replaceable component. In some examples, the failure of another component may lead to the failure of the first and/or second replaceable component. For example, a component failure in the print apparatus may cause or lead to a failure of the first replaceable component or the second replaceable component.

In one example, in an LEP print apparatus, a printable substrate, such as paper may become adhered to the printing blanket by remnants of print agent (e.g. print fluid or ink) that remain on the blanket. This may, for example, result from a fault in a substrate transport mechanism of the print apparatus. The remnants of print agent may also be transferred back onto the photoconductive surface (e.g. the PIP) and, in some instances, this may result in a severe paper jam. In such cases, both the PIP and the printing blanket may become damaged, and it may be appropriate to replace both components at the same time (i.e. perform a parallel replacement).

At block 204, the method 200 may further comprise, responsive to determining that the first replaceable component and the second replaceable component have both resulted in or are associated with the occurrence of print quality defects and/or component failures, enabling replacement of the second replaceable component. A particular component may be associated with a print quality defect or a failure of a component if the defect or failure is somehow (e.g. directly or indirectly) related to the particular component. Thus, if both the first and second replaceable components are deemed or inferred to have failed (as in the example given above) or are both associated with a component failure or print quality defect, then replacement of the second replaceable component may be enabled. It may not be possible to determine that a component has definitely failed and, therefore, an inference or presumption (e.g. based on a visual inspection of the component or of a printed image) that there has been a failure may be sufficient to enable the replacement of the second replaceable component. In this example, restricting the replacement of the second replaceable component (at block 110) may be considered to comprise obtaining the information regarding the print quality defect or component failure. Thus, the replacement is restricted because, before enabling the replacement (e.g. by providing access to the replacement wizard), further information regarding defects and failures is obtained/received. In some examples, if it is determined that the first replaceable component and the second replaceable component both resulted in or are associated with the occurrence of print quality defects and/or component failures, a parallel replacement of the first and second replaceable components may not be recorded as such in any data recording numbers of parallel replacements performed.

In some examples, the method 200 may comprise, at block 206, receiving information regarding a print quality defect or a component failure resulting from, or associated with, the first replaceable component or the second replaceable component. In this example, in contrast to block 202, in which defect and/or failure information is obtained in respect of both the first and second replaceable components, block 206 involves obtaining information about a defect or a failure in respect of either the first replaceable component or the second replaceable component. The method 200 may, in some examples, further comprise, at block 208, responsive to determining that the print quality defect and/or the component failure is one of a defined set of print quality defects or component failures, enabling replacement of the second replaceable component. Thus, there may exist a defined set or list of defects or failures which, if suffered by the first or second replaceable components, would result in the replacement of the second replaceable component being enabled (i.e. a parallel replacement would be enabled). Examples of defects or failures that might be included in the defined set of defects or failures include paper jams that cause print agent to become adhered to a component, and defects that result in paper or substrate becoming adhered to a component. For example, if a failure were to occur in a substrate transport mechanism of the print apparatus, a printable substrate may not be in position to receive print agent from a transfer medium (e.g. the printing blanket). During rotation of the drum holding the printing blanket and rotation of the PIP, remnants of print agent remaining on the printing blanket may be transfer back onto the PIP, causing damage to both the printing blanket and the PIP. Such defects or failures may be referred to as "to-ignore-events", as they may be ignored when considering whether or not to restrict the placement of the second replaceable component, or the extent to which replacement of the second replaceable component may be restricted.

In some examples, a parallel replacement may be enabled (i.e. not restricted), or a restriction placed on the replacement of the second replaceable component may be lifted, in the event that a print quality defect or a component failure associated with the first or second replaceable components occurred within a defined number of print impressions since the first replaceable component or the second replaceable component was last replaced. In other words, if a print quality defect associated with the first or second replaceable component occurred within, say, 200 print impressions of the last replacement of the first or second replaceable component, then the parallel replacement may be enabled. A failure or defect occurring so soon after a previous replacement may indicate a defective component and, in such a scenario, replacement may not be restricted. Thus, following the receiving of information at block 206, the method 200 may, in some examples, comprise, responsive to determining that the print quality defect or the component failure has occurred within a defined threshold number of print impressions made by the print apparatus since a previous replacement of the first replaceable component or the second replaceable component, enabling replacement of the second replaceable component. The defined threshold number of print impressions may comprise 100, 200, 300, 400 500 or any other threshold number of impressions. In some examples, if it is determined that the print quality defect or the component failure has occurred within a defined threshold number of print impressions made by the since a previous replacement of the first replaceable component or the second replaceable component, a parallel replacement of the first and second replaceable components may not be recorded as such in any data recording numbers of parallel replacements performed.

As discussed above, if, following the replacement of the first replaceable component, determined that the second replaceable component is estimated to be usable for a significant number of print impressions, then an operator may be discouraged from replacing the second replaceable component in a parallel replacement. However, if it is determined that the second replaceable component is nearing the end of its estimated life (e.g. if the estimated remaining life of the second replaceable component is less than a defined threshold), then replacement of the second replaceable component may be enabled, or any restriction on the replacement of that component may be lifted. Thus, the method 200 may further comprise, at block 212, determining, for the second replaceable component, an estimated remaining life span based on an estimated number of print impressions that can be made using the second replaceable component. The estimated remaining life span of the second replaceable component may be determined, for example, by subtracting the number of print impressions for which the second replaceable component has already been used from a total estimated number of print impressions for which the second replaceable component can be used. If it is determined from the estimated remaining life that the second replaceable component is nearing the expected end of its life, then its replacement may be enabled. Thus, at block 214, the method 200 may further comprise, responsive to determining that the estimated remaining life span of the second replaceable component is below a defined threshold, enabling replacement of the second replaceable component. In this example, the defined threshold may comprise 10, 20, 30, 40 or 50 print impressions, or any other number of print impressions. As noted above, the estimated remaining life span of a component may be dynamic, in that it may increase as the number of print impressions for which it has been used increases. While FIG. 2 shows various blocks as alternatives to one another, it is to be understood that, in some examples, the tasks of multiple blocks may be performed sequentially, or concurrently.

Figure 3:
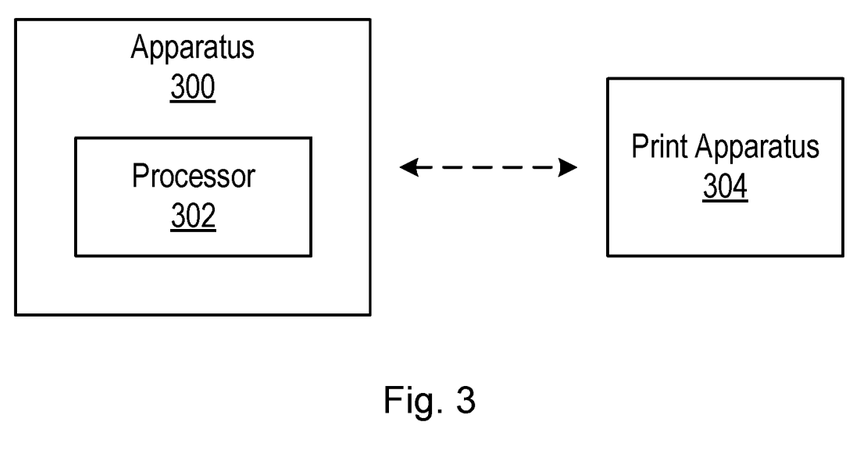
FIG. 3 is a schematic illustration of an example of apparatus for restricting the replacement of a replaceable component.

The present disclosure also provides an apparatus for restricting replacement of components. FIG. 3 is a schematic illustration of an example of apparatus 300. The apparatus 300 comprises a processor 302. The apparatus 300 and/or the processor 302 of the apparatus may be in communication (e.g. via a wired connection or a wireless connection) with a print apparatus 304. The processor 302 may perform the blocks of the methods 100, 200 discussed above. The processor 302 is to determine that a first replaceable print component of a print apparatus 304 has been replaced. The processor 302 is also to receive, from a processor of the print apparatus 304, prior to an advancement of an impression count of a print impression counter of the print apparatus, a signal indicating that a request has been made to replace a second replaceable print component of the print apparatus 304. The processor 302 is also to acquire details of occurrences of previous replacements of replaceable print components of the print apparatus 304. The processor 302 may, in some examples, acquire the details from a memory and/or a processor of the print apparatus 304 while, in other examples, the processor 302 may acquire the details from a database or other data structure stored in another memory or storage medium. The processor 302 is also to determine, based on the acquired details, whether or not restrictive action is to be taken in respect of the replacement of the second replaceable print component. Responsive to determining that restrictive action is to be taken, the processor 302 is also to take action to restrict replacement the second replaceable print component. Examples of restrictive action taken by the processor 302 include the restrictive actions discussed above with regard to the method 200.

In some examples, restrictive action may be taken in respect of the replacement of the second replaceable print component if the acquired details indicate that the replacement of multiple replaceable print components at the same print impression count of the print apparatus has occurred more than a defined threshold number of times. In some examples, the proportion of replacements of multiple replacements relative to the total number of replacements may be taken into account. For example, restrictive action may be taken if more than 50% of component replacements are made as part of multiple replacements at the same print impression count of the print apparatus.

The processor 302 may, in some examples, deliver, to the processor of the print apparatus 304, an instruction to request an input from a user, the input comprising an indication of the reason for requesting replacement of the second replaceable print component. In some examples, the processor 302 may, responsive to determining that a user has provided the requested input, enable the replacement of the second replaceable print component. Otherwise, if the user provides the requested input (e.g. via the user interface of the print apparatus 304), then any restrictive action taken in respect of the replacement of the second replaceable print component may be ended.

In some examples, the restrictive action may comprise instructing the print apparatus 304 to request a user input, or preventing further printing apparatus from being performed using the print apparatus until a defined criterion has been met. Such a defined criterion may, for example, comprise providing an indication that a print quality defect or a component failure associated with the second replaceable print component has taken place.

Figure 4:
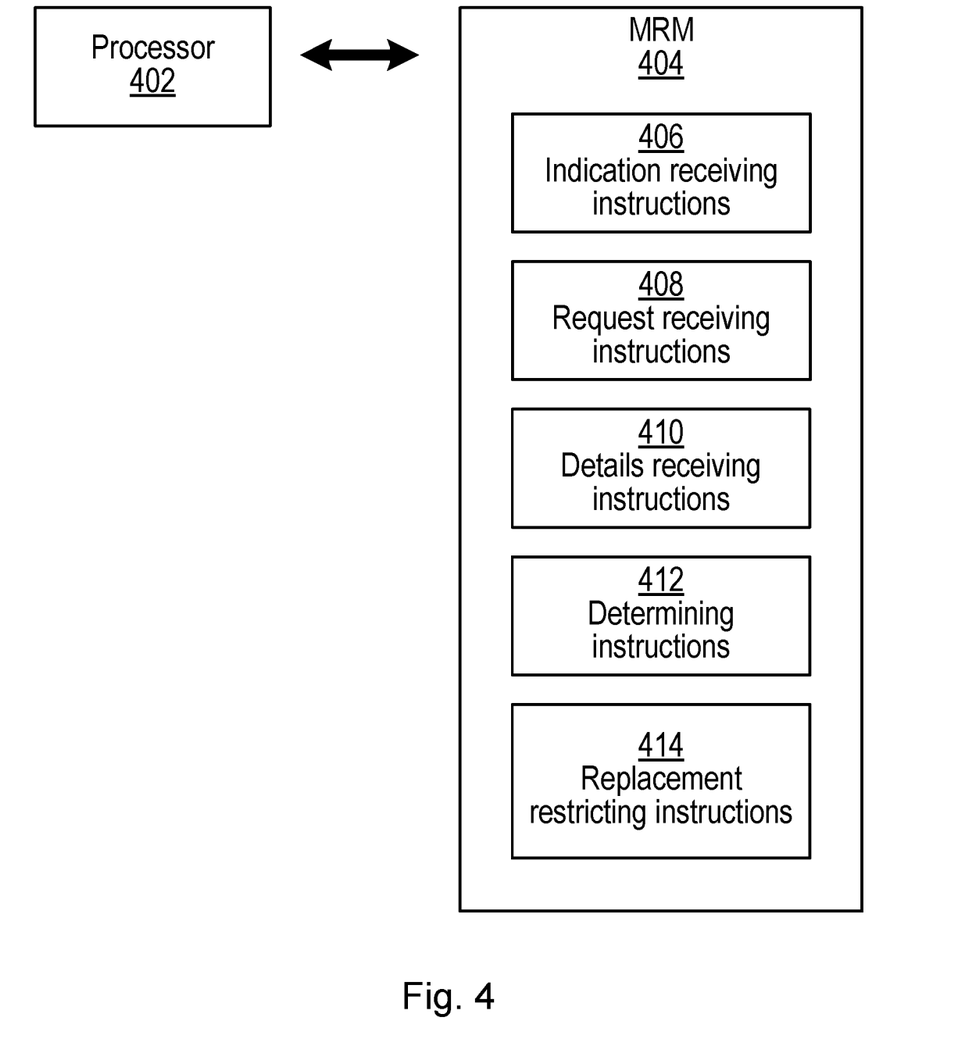
FIG. 4 is a schematic illustration of a processor in communication with a machine-readable medium.

The present disclosure also provides a machine-readable medium. FIG. 4 is a schematic illustration of a processor 402 in communication with a machine-readable medium 404. The machine-readable medium 404 comprises instructions which, when executed by the processor 402, cause the processor to perform blocks of the methods 100, 200 discussed above. In one example, the machine-readable medium 404 comprises instructions (e.g. indication receiving instructions 406) which, when executed by the processor 402, cause the processor to receive an indication that a first replaceable component of a print apparatus has been replaced. The machine-readable medium 404 comprises instructions (e.g. request receiving instructions 408) which, when executed by the processor 402, cause the processor, prior to the print apparatus being used to perform a printing operation since replacing the first replaceable component, to receive a request to replace a second replaceable component of the print apparatus. The machine-readable medium 404 comprises instructions (e.g. details receiving instructions 410) which, when executed by the processor 402, cause the processor to receive details of replaceable components of the print apparatus that have been replaced previously, prior to replacement of the first replaceable component, the details comprising an indication of each replaceable component replaced and an indication of a print impression count of the print apparatus when each replaceable component was replaced. The print impression count may, for example, indicate the number of print impressions that have been performed by the print apparatus or using the first and/or second replaceable components at the time of receiving the request to replace the second replaceable component. The machine-readable medium 404 comprises instructions (e.g. determining instructions 412) which, when executed by the processor 402, cause the processor to determine, based on the received details, whether or not replacement of the second replaceable component is to be restricted. The machine-readable medium 404 comprises instructions (e.g. replacement restricting instructions 414) which, when executed by the processor 402, cause the processor, responsive to determining that replacement of the second replaceable component is to be restricted, to restrict replacement of second replaceable component.

Examples disclosed herein provide a mechanism by which details of previous replacements of components in a print apparatus are taken into account when deciding whether or not to restrict the replacement of a second component immediately following the replacement of a first component (i.e. when an attempt is made to replace two components of the print apparatus without the print apparatus being used to perform a print impression between the two replacements. In this way, it may be possible to prevent such so-called parallel replacements from being made, thereby reducing wastage of components which could still be utilised.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc., or a processor provided via a distributed computing environment. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A computer-implemented method comprising:
receiving a first indication that a first replaceable component of a print apparatus has been replaced;
receiving, prior to any print impressions being made using the print apparatus since receiving the first indication, a second indication of an intention to replace a second replaceable component of the print apparatus;
retrieving data regarding previous replacements of replaceable components of the print apparatus;
determining, based on the retrieved data, whether or not replacement of the second replaceable component is to be restricted, wherein replacement of the second replaceable component is to be restricted if the retrieved data indicates that a number of occurrences of multiple replaceable components being replaced at the same print impression count of the print apparatus exceeds a defined threshold; and
responsive to determining that replacement of the second replaceable component is to be restricted, restricting replacement of the second replaceable component.

2. A computer-implemented method according to claim 1, wherein restricting replacement of the second replaceable component comprises:
   causing the print apparatus to display a message on a user interface of the print apparatus; and
   causing the print apparatus to receive a user input before enabling the replacement of the second replaceable component.

3. A computer-implemented method according to claim 1, wherein restricting replacement of the second replaceable component comprises:
   causing the print apparatus to display a message on a user interface of the print apparatus; and
   restricting further printing operations using the print apparatus until is it determined that a defined user input has been received via the print apparatus.

4. A computer-implemented method according to claim 1, wherein restricting replacement of the second replaceable component comprises:
   restricting further printing operations using the print apparatus, until it is determined that a defined criterion has been met.

5. A computer-implemented method according to claim 1, further comprising:
   determining, for the second replaceable component, an estimated remaining life span based on an estimated number of print impressions that can be made using the second replaceable component; and
   responsive to determining that the estimated remaining life span of the second replaceable component is below a defined threshold, enabling replacement of the second replaceable component.

6. A computer-implemented method comprising:
   receiving a first indication that a first replaceable component of a print apparatus has been replaced;
   receiving, prior to any print impressions being made using the print apparatus since receiving the first indication, a second indication of an intention to replace a second replaceable component of the print apparatus;
   retrieving data regarding previous replacements of replaceable components of the print apparatus;
   determining, based on the retrieved data, whether or not replacement of the second replaceable component is to be restricted;
responsive to determining that replacement of the second replaceable component is to be restricted, restricting replacement of the second replaceable component;
   receiving information regarding print quality defects and/or component failures resulting from, or associated with, the first replaceable component and the second replaceable component; and
   responsive to determining that the first replaceable component and the second replaceable component have both resulted in or are associated with the occurrence of print quality defects and/or component failures, enabling replacement of the second replaceable component.

7. A computer-implemented method comprising:
   receiving a first indication that a first replaceable component of a print apparatus has been replaced;
   receiving, prior to any print impressions being made using the print apparatus since receiving the first indication, a second indication of an intention to replace a second replaceable component of the print apparatus;
   retrieving data regarding previous replacements of replaceable components of the print apparatus;
   determining, based on the retrieved data, whether or not replacement of the second replaceable component is to be restricted;
responsive to determining that replacement of the second replaceable component is to be restricted, restricting replacement of the second replaceable component;
   receiving information regarding a print quality defect or a component failure resulting from, or associated with, the first replaceable component or the second replaceable component; and
   responsive to determining that the print quality defect and/or the component failure is one of a defined set of print quality defects or component failures, enabling replacement of the second replaceable component.

8. A computer-implemented method comprising:
   receiving a first indication that a first replaceable component of a print apparatus has been replaced;
   receiving, prior to any print impressions being made using the print apparatus since receiving the first indication, a second indication of an intention to replace a second replaceable component of the print apparatus;
   retrieving data regarding previous replacements of replaceable components of the print apparatus;
   determining, based on the retrieved data, whether or not replacement of the second replaceable component is to be restricted;
responsive to determining that replacement of the second replaceable component is to be restricted, restricting replacement of the second replaceable component;
   receiving information regarding a print quality defect or a component failure resulting from, or associated with, the first replaceable component or the second replaceable component; and
   responsive to determining that the print quality defect or the component failure has occurred within a defined threshold number of print impressions made by the print apparatus since a previous replacement of the first replaceable component or the second replaceable component, enabling replacement of the second replaceable component.

9. An apparatus, comprising:
   a processor to:
      determine that a first replaceable print component of a print apparatus has been replaced;
      receive, from a processor of the print apparatus, prior to an advancement of an impression count of a print impression counter of the print apparatus, a signal indicating that a request has been made to replace a second replaceable print component of the print apparatus;
      acquire details of occurrences of previous replacements of replaceable print components of the print apparatus;
      determine, based on the acquired details, whether or not restrictive action is to be taken in respect of the replacement of the second replaceable print component, wherein restrictive action is to be taken in respect of the replacement of the second replaceable print component if the acquired details indicate that the replacement of multiple replaceable print components at the same print impression count of the print apparatus has occurred more than a defined threshold number of times; and
      responsive to determining that restrictive action is to be taken, take action to restrict replacement of the second replaceable print component.

10. An apparatus according to claim 9, wherein the restrictive action comprises:
instructing the print apparatus to request a user input, or preventing further printing from being performed using the print apparatus until a defined criterion has been met.

11. An apparatus according to claim 9, wherein the first replaceable print component or the second replaceable print component comprises a component selected from a group comprising:
a photoconductive surface;
a transfer medium to receive print agent from the photoconductive surface;
a print agent application assembly base; and
a developer roller of a print agent application assembly.

12. An apparatus comprising:
a processor to:
determine that a first replaceable print component of a print apparatus has been replaced;
receive, from a processor of the print apparatus, prior to an advancement of an impression count of a print impression counter of the print apparatus, a signal indicating that a request has been made to replace a second replaceable print component of the print apparatus;
acquire details of occurrences of previous replacements of replaceable print components of the print apparatus;
determine, based on the acquired details, whether or not restrictive action is to be taken in respect of the replacement of the second replaceable print component;
responsive to determining that restrictive action is to be taken, take action to restrict replacement of the second replaceable print component;
deliver, to the processor of the print apparatus, an instruction to request an input from a user, the input comprising an indication of the reason for requesting replacement of the second replaceable print component; and
responsive to determining that a user has provided the requested input, enabling the replacement of the second replaceable print component.

13. A machine-readable medium comprising instructions which, when executed by a processor, cause the processor to:
receive an indication that a first replaceable component of a print apparatus has been replaced;
prior to the print apparatus being used to perform a printing operation since replacing the first replaceable component, receive a request to replace a second replaceable component of the print apparatus;
receive details of replaceable components of the print apparatus that have been replaced previously, prior to replacement of the first replaceable component, the details comprising an indication of each replaceable component replaced and an indication of a print impression count of the print apparatus when each replaceable component was replaced;
determine, based on the received details, whether or not replacement of the second replaceable component is to be restricted, wherein replacement of the second replaceable component is to be restricted if the retrieved data indicates that a number of occurrences of multiple replaceable components being replaced at the same print impression count of the print apparatus exceeds a defined threshold; and
responsive to determining that replacement of the second replaceable component is to be restricted, restrict replacement of second replaceable component.

\* \* \* \* \*